United States Patent
Okui

(10) Patent No.: US 10,629,921 B2
(45) Date of Patent: Apr. 21, 2020

(54) FUEL CELL SINGLE CELL

(71) Applicant: NISSAN MOTOR CO., LTD., Yokohama-shi, Kanagawa (JP)

(72) Inventor: Takehiko Okui, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 16/091,552

(22) PCT Filed: Apr. 8, 2016

(86) PCT No.: PCT/JP2016/061507
§ 371 (c)(1),
(2) Date: Oct. 5, 2018

(87) PCT Pub. No.: WO2017/175371
PCT Pub. Date: Oct. 12, 2017

(65) Prior Publication Data
US 2019/0109333 A1    Apr. 11, 2019

(51) Int. Cl.
| | |
|---|---|
| *H01M 8/0258* | (2016.01) |
| *H01M 8/12* | (2016.01) |
| *H01M 8/0254* | (2016.01) |
| *H01M 8/0232* | (2016.01) |
| *H01M 8/1286* | (2016.01) |
| *H01M 8/0256* | (2016.01) |
| *H01M 8/0273* | (2016.01) |

(52) U.S. Cl.
CPC ....... *H01M 8/0258* (2013.01); *H01M 8/0232* (2013.01); *H01M 8/0254* (2013.01); *H01M 8/12* (2013.01); *H01M 8/1286* (2013.01); *H01M 8/0256* (2013.01); *H01M 8/0273* (2013.01)

(58) Field of Classification Search
CPC ..... H01M 8/02; H01M 8/0228; H01M 8/0258
See application file for complete search history.

(56) References Cited

U.S. PATENT DOCUMENTS

| | | | |
|---|---|---|---|
| 5,378,247 A | * | 1/1995 | Sasaki ................ H01M 8/0228 29/623.1 |
| 6,544,681 B2 | | 4/2003 | Mclean et al. |
| 8,304,140 B2 | | 11/2012 | Sugiura et al. |

(Continued)

FOREIGN PATENT DOCUMENTS

| | | |
|---|---|---|
| CN | 103748720 A | 4/2014 |
| EP | 2 017 914 A1 | 1/2009 |

(Continued)

*Primary Examiner* — Karie O'Neill Apicella
(74) *Attorney, Agent, or Firm* — Foley & Lardner LLP

(57) ABSTRACT

The fuel cell single cell of the present invention includes: a fuel cell unit in which an anode electrode, an electrolyte layer and a cathode electrode are sequentially laminated; a separator; and a current collection assisting layer disposed between the cathode electrode of the fuel cell unit and the separator. The separator has protruded portions that are in contact with the current collection assisting layer to form gas channels between the separator and the current collection assisting layer.
Further, at least a part of an end of the cathode electrode in a planar direction of the cathode electrode extends outward beyond an end of the current collection assisting layer in a planar direction of the current collection assisting layer.

13 Claims, 12 Drawing Sheets

(56) References Cited

U.S. PATENT DOCUMENTS

| | | | |
|---|---|---|---|
| 2011/0287334 A1* | 11/2011 | Tanaka | H01M 4/8626 |
| | | | 429/480 |
| 2013/0177832 A1* | 7/2013 | Tsubosaka | H01M 8/0271 |
| | | | 429/480 |
| 2014/0170522 A1 | 6/2014 | Hotta et al. | |
| 2015/0099208 A1 | 4/2015 | Sugiura et al. | |

FOREIGN PATENT DOCUMENTS

| JP | 2001-068132 A | 3/2001 |
|---|---|---|
| JP | 2006-331944 A | 12/2006 |
| JP | 2008-108656 A | 5/2008 |
| JP | 2008-293741 A | 12/2008 |
| JP | 2013-051128 A | 3/2013 |
| JP | 2016-039099 A | 3/2016 |

* cited by examiner

FUEL CELL SINGLE CELL

TECHNICAL FIELD

The present invention is directed to a fuel cell single cell that includes a current collection assisting layer between a cathode electrode and a separator. In more detail, the present invention relates to a fuel cell single cell in which breakage of an electrolyte by such a current collection assisting layer is prevented.

BACKGROUND ART

In recent years, fuel cells have drawn attention as an eco-friendly clean energy source that has high power generation efficiency and produces little harmful gas.

A solid oxide fuel cell (hereinafter also referred to simply as an "SOFC"), which is a type of fuel cells, comprises a fuel cell unit and a separator, and the fuel cell unit comprises a solid oxide electrolyte layer, a gas-permeable cathode electrode (air electrode) and a gas-permeable anode electrode (fuel electrode).

The fuel cell generates power when a fuel gas such as hydrogen or hydrocarbon and an oxygen-containing gas are supplied respectively to the anode electrode and the cathode electrode while the solid electrolyte layer serves as a partition wall.

The separator is in contact with the fuel cell unit to collect charges of the fuel cell unit and to form a fuel gas channel or an oxygen-containing gas channel between the fuel cell unit and the separator.

The cathode electrode of the fuel cell unit is made of a metal oxide, and such metal oxides have higher electric resistance than metals.

Accordingly, when charges travel a long distance in the cathode electrode, the power generation efficiency is decreased. To avoid this, a current collection assisting layer is provided between the cathode electrode and the separator to form a conductive path so as to reduce the electric resistance.

JP2008-108656A or Patent Document 1 discloses a fuel cell that comprises a current collection assisting layer that is disposed between a cathode electrode and a separator and comprises a metal felt and a metal mesh.

CITATION LIST

Patent Literature

Patent Document 1: JP 2008-108656A

SUMMARY OF INVENTION

Technical Problem

However, the current collection assisting layer often has protrusions such as burr at the ends, and the operating temperature of SOFCs is high. Therefore, thermal expansion during operation or the like may sometimes cause the separator to press the current collection assisting layer so that the protrusions damage the solid electrolyte layer.

Such a damage of the solid electrolyte layer may sometimes cause cross leak of gas to reduce the power generation efficiency. Further, the protrusions may sometimes penetrate the solid electrolyte layer to make a hole to cause a short circuit.

The present invention has been made in view of the above-described problem in the prior art, and an object thereof is to provide a fuel cell single cell in which breakage of a solid electrolyte layer by a current collection assisting layer is prevented.

Solution to Problem

As a result of keen study for achieving the above-described object, the present inventors have found that the above-described breakage of the solid electrolyte layer by the current collection assisting layer can be prevented by using the cathode electrode between the current collection assisting layer and the solid electrolyte layer as a cushion and extending the end of the cathode electrode in the planar direction outward beyond the end of the current collection assisting layer in the planar direction.

That is, the fuel cell single cell of the present invention comprises: a fuel cell unit in which an anode electrode, an electrolyte layer and a cathode electrode are sequentially laminated; a separator; and a current collection assisting layer disposed between the cathode electrode of the fuel cell unit and the separator. The separator comprises protruded portions that are in contact with the current collection assisting layer to form gas channels between the separator and the current collection assisting layer.

Further, at least a part of an end of the cathode electrode in a planar direction of the cathode electrode extends outward beyond an end of the current collection assisting layer in a planar direction of the current collection assisting layer.

In the present invention, the fuel cell single cell comprises the current collection assisting layer between the cathode electrode and the separator, and the end of the cathode electrode in the planar direction of the cathode electrode extend outward beyond the end of the current collection assisting layer in the planar direction of the current collection assisting layer. This allows the cathode electrode to function as a cushion to prevent a breakage of the solid electrolyte layer by the current collection assisting layer.

DESCRIPTION OF EMBODIMENTS

The fuel cell single cell of the present invention will be described in detail.

First Embodiment

Figure 1:
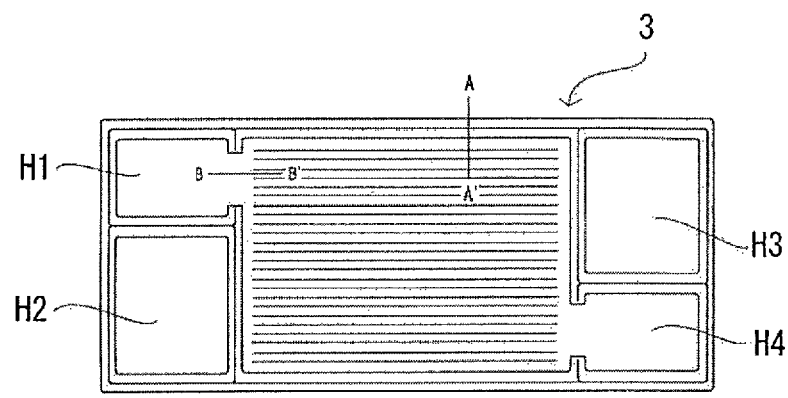
FIG. 1 is an exploded plan view of a fuel cell single cell, illustrating the configuration thereof.
Figure 1:
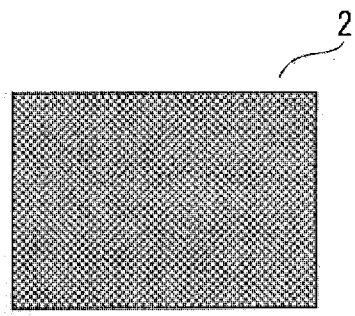
Figure 1:
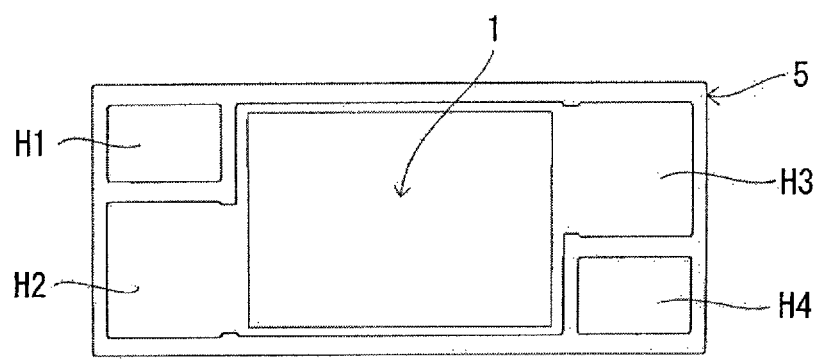

FIG. 1 is an exploded view of the fuel cell single cell C of the present invention, illustrating the configuration thereof.

The fuel cell single cell C comprises a fuel cell unit 1, a current collection assisting layer 2 and a separator 3.

Figure 2:
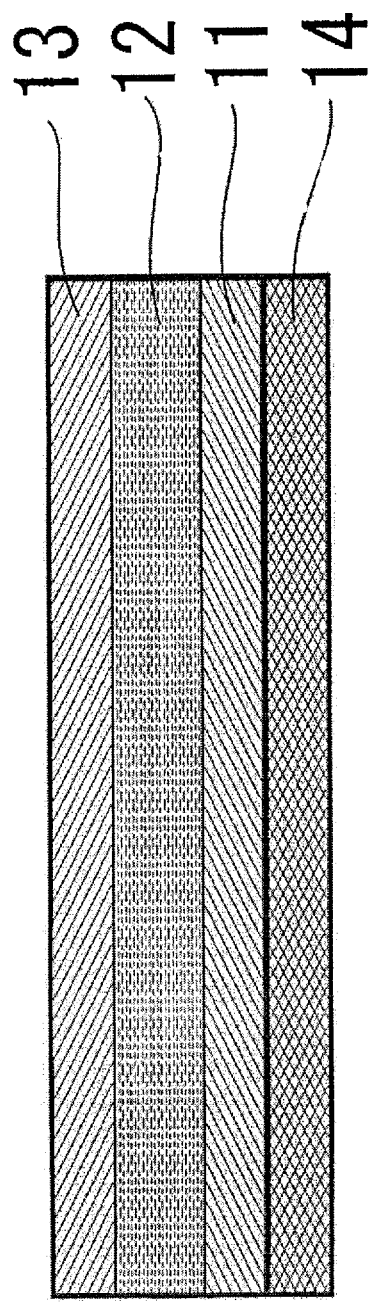
FIG. 2 is a cross-sectional view of the fuel cell unit, illustrating the layer configuration thereof.

As illustrated in FIG. 2, the fuel cell unit comprise an anode electrode 11, a solid electrolyte layer 12 and a cathode electrode 13, which are sequentially laminated and supported by a porous metal support. The fuel cell unit further comprises a frame 5 around the periphery of the porous metal support 14.

Specifically, in the fuel cell unit 1, the porous metal support 14, an anode electrode 11, the solid electrolyte layer 12 and the cathode electrode 13 are sequentially laminated in the frame 5 in the area illustrated by the 1 in FIG. 1.

Further, the current collection assisting layer 2 and the separator 3 are sequentially laminated on the cathode side of the fuel cell unit 1.

The frame 5 and the separator 3 have a rectangular shape with approximately the same length and width. The fuel cell unit 1, the frame 5 and the separator 3 are laminated and joined to each other to form the fuel cell single cell C.

The separator 3 has a corrugated transverse cross section at the center part corresponding to the fuel cell unit 1. The corrugation extends in the longitudinal direction as illustrated in FIG. 1. Accordingly, protruded portions 31 of the corrugation of the separator 3 are in contact with the current collection assisting layer 2 to form gas channels G in the recessed portions of the corrugation.

The fuel cell single cell C comprises manifold portions H1 to H4 that penetrate the frame 5 and the separator 3 in the laminating direction. An oxygen-containing gas is supplied to the cathode electrode 13 of the fuel cell unit 1, and a fuel gas is supplied to the anode electrode 11.

Figure 3:
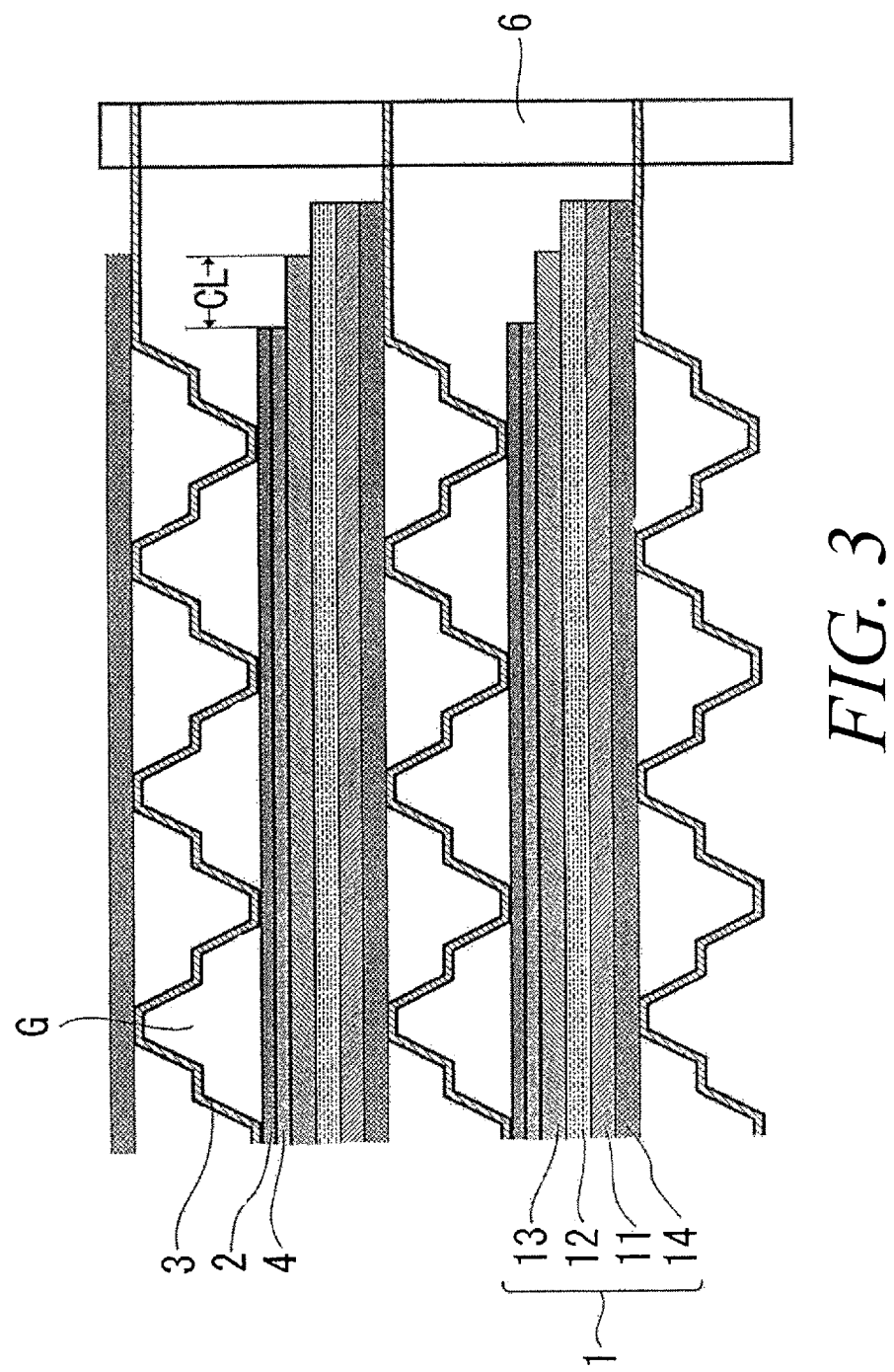
FIG. 3 is a cross-sectional view of a main part of a fuel cell single cell according to a first embodiment.

FIG. 3 is a cross-sectional view taken along A-A' in FIG. 1.

In FIG. 3, the fuel cell unit, the anode electrode, the solid electrolyte layer, the cathode electrode, the porous metal support, the current collection assisting layer, the separator, a contacting material layer and a sealing member are denoted respectively by 1, 11, 12, 13, 14, 2, 3, 4 and 6.

The components of the fuel cell single cell will be described.

Cathode Electrode

The cathode electrode 13 of the present invention functions not only as a power generating component but also as a cushion that prevents protrusions of the current collection assisting layer from attacking the solid electrolyte layer 12 to damage it. At least a part of the end of the cathode electrode 13 in the planar direction of the cathode electrode extends outward beyond the end of the current collection assisting layer 2 in the planar direction of the current collection assisting layer.

It is preferred that the extended length (CL) of the end of the cathode electrode that extends outward beyond the end of the current collection assisting layer 2 (described below) is longer than the thermal expansion difference between the solid electrolyte layer 12 and the current collection assisting layer 2.

The thermal expansion of the solid electrolyte layer 12 is used as a reference because the cathode electrode 13 is joined to the solid electrolyte layer 12, and in-plane expansion and shrinkage of the cathode electrode 13 follows expansion and shrinkage of the solid electrolyte layer 12.

Since the extended length (CL) is longer than the thermal expansion difference between the solid electrolyte layer 12 and the current collection assisting layer 2, the end of the cathode electrode 13 always extends beyond the end of the current collection assisting layer 2 even when the solid electrolyte layer 12 and the current collection assisting layer 2 thermally expand. This allows the cathode electrode 13 to function as a cushion so as to prevent a damage of the solid electrolyte layer 12.

Specifically, it is preferred that the extended length (CL) is greater than $1/1000$ of the length of the cathode electrode 13 although it depends on the solid electrolyte layer 12 and the current collection assisting layer 2.

For example, the linear expansion coefficient of ferrite stainless steel used in the current collection assisting layer 2 is $11.9 \times 10^{-6}/°$ C. (average of 0° C. to 650° C.), and the linear expansion coefficient of YSZ used in the solid electrolyte layer 12 is $10.5 \times 10^{-6}/°$ C. Accordingly, it is possible to prevent a damage of the solid electrolyte layer 12 when the extended length (CL) is greater than $1/1000$ of the length of the cathode electrode 13.

Since the portion of the cathode electrode 13 that extends beyond the end of the current collection assisting layer 2 is not used for power generation, it is preferred that the upper limit of the extended length (CL) is approximately $1/100$.

As used herein, the length of the cathode electrode 13 refers to the total length of the cathode electrode 13 in the direction of extending outward beyond the end of the current collection assisting layer 2.

Examples of materials of the cathode electrode 13 include perovskite-type oxides.

Examples of such perovskite-type oxides include perovskite oxides (e.g. LSCF (lanthanum strontium cobalt ferrite), LSM (lanthanum strontium manganite)) and the like.

Anode Electrode

Materials that can be used as the anode electrode 11 are metal catalysts that are composed of a metal and/or an alloy, has hydrogen-oxidizing activity and are stable in a reductive atmosphere.

Examples of such metal catalysts include nickel (Ni), palladium (Pd), platinum (Pt), ruthenium (Ru), Ni—Fe alloys, Ni—Co alloys, Fe—Co alloys, Ni—Cu alloys, Pd—Pt alloys and the like.

Solid Oxide Layer

Materials that can be used as the solid electrolyte layer 12 of the fuel cell unit 1 are oxides that have oxygen-ion conductivity and function as a solid electrolyte.

Examples include YSZ (yttria-stabilized zirconia: $Zr_{1-x}Y_xO_2$), SSZ (scandium-stabilized zirconia: $Zr_{1-x}Sc_xO_2$), SDC (samarium-doped ceria: $Ce_{1-x}Sm_xO_2$), GDC (gadolinium-doped ceria: $Ce_{1-x}Gd_xO_2$), LSGM (lanthanum strontium magnesium gallate: $La_{1-x}Sr_xGa_{1-y}Mg_yO_3$) and the like.

Porous Metal Support

The porous metal support 14 supports the anode electrode 11, the solid electrolyte layer 12 and the cathode electrode 13 from the anode electrode 11.

The porous metal support 14 may have many continuous pores that penetrate the porous metal support 14 in the laminating direction.

Examples that can be used as the porous metal support 14 are metal particles or metal fiber shaped by sintering or press working, a porous metal plate with pores formed by etching or machining, and the like.

Examples of metal materials of the porous metal support 14 include stainless steel, iron (Fe), nickel (Ni), copper (Cu), platinum (Pt), silver (Ag) and the like.

The fuel cell unit 1 can be formed by laminating it on one side of the porous metal support 14. The fuel cell unit 1 may be laminated by either dry method or wet method.

Examples of dry methods include direct current heating deposition, ion beam deposition, reactive ion beam deposition, bipolar sputtering, magnetron sputtering, reactive sputtering, tripolar sputtering, ion beam sputtering, ion plating, hollow cathode beaming, ion beam injection, plasma CVD and any combination thereof.

Examples of wet methods include ink-jetting, dispenser, roll coater, screen printing and any combination thereof. Slurry or paste can be used to form the films.

Current Collection Assisting Layer

The current collection assisting layer 2 is provided to form a conductive path from the cathode electrode 13 to the separator 3 to facilitate migration of charges from the cathode electrode 13 to the separator 3 so as to decrease the overall electric resistance of the fuel cell single cell. The current collection assisting layer 2 comprises a conductive portion 21 of a metal material and gas flowing holes 22 that penetrate the current collection assisting layer 2 in the laminating direction.

Figure 4:
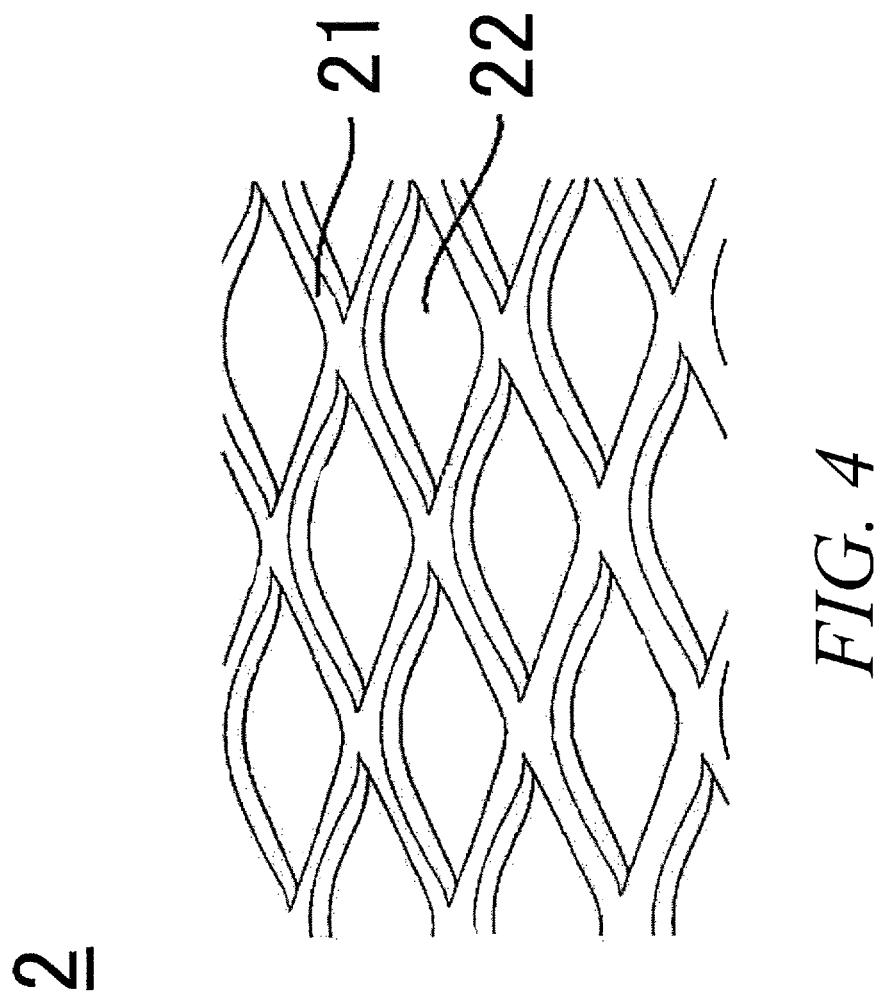
FIG. 4 illustrates an example of an expanded metal.
Figure 5:
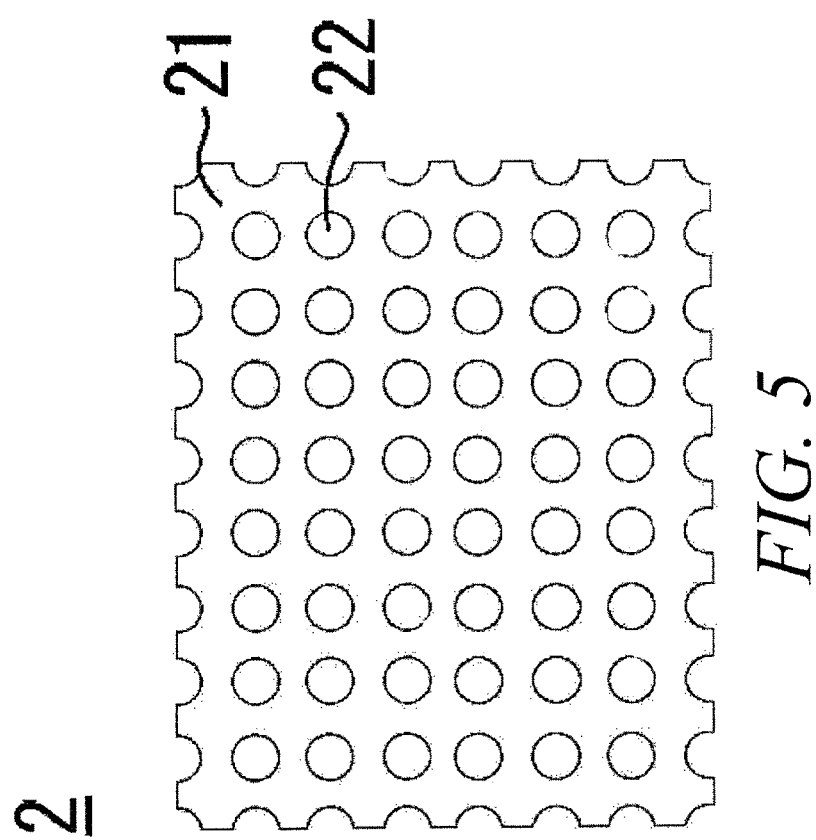
FIG. 5 illustrates an example of a perforated metal.
Figure 6:
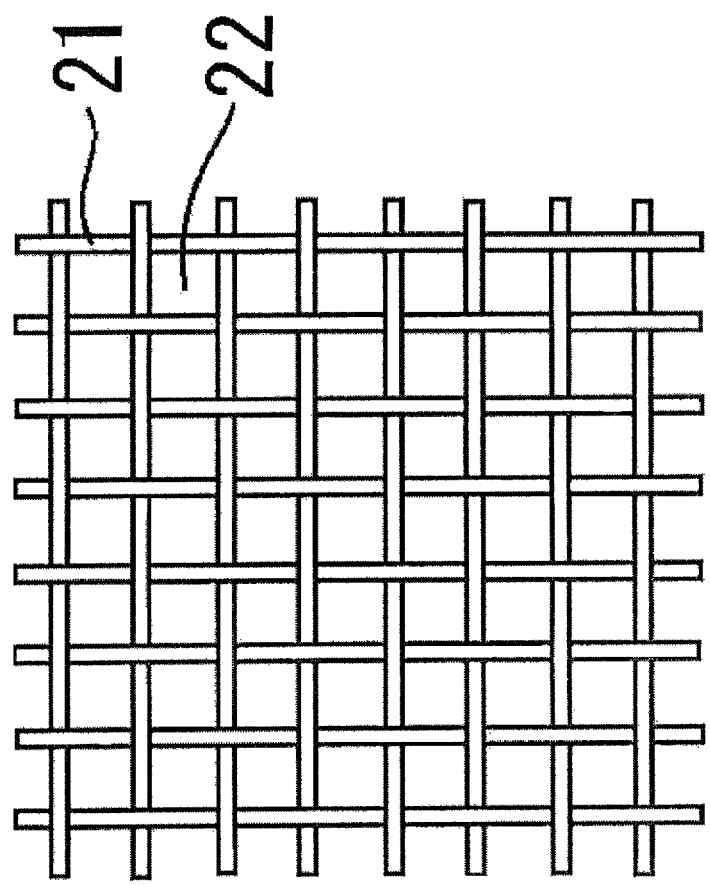
FIG. 6 illustrates an example of a metal mesh.
Figure 7:
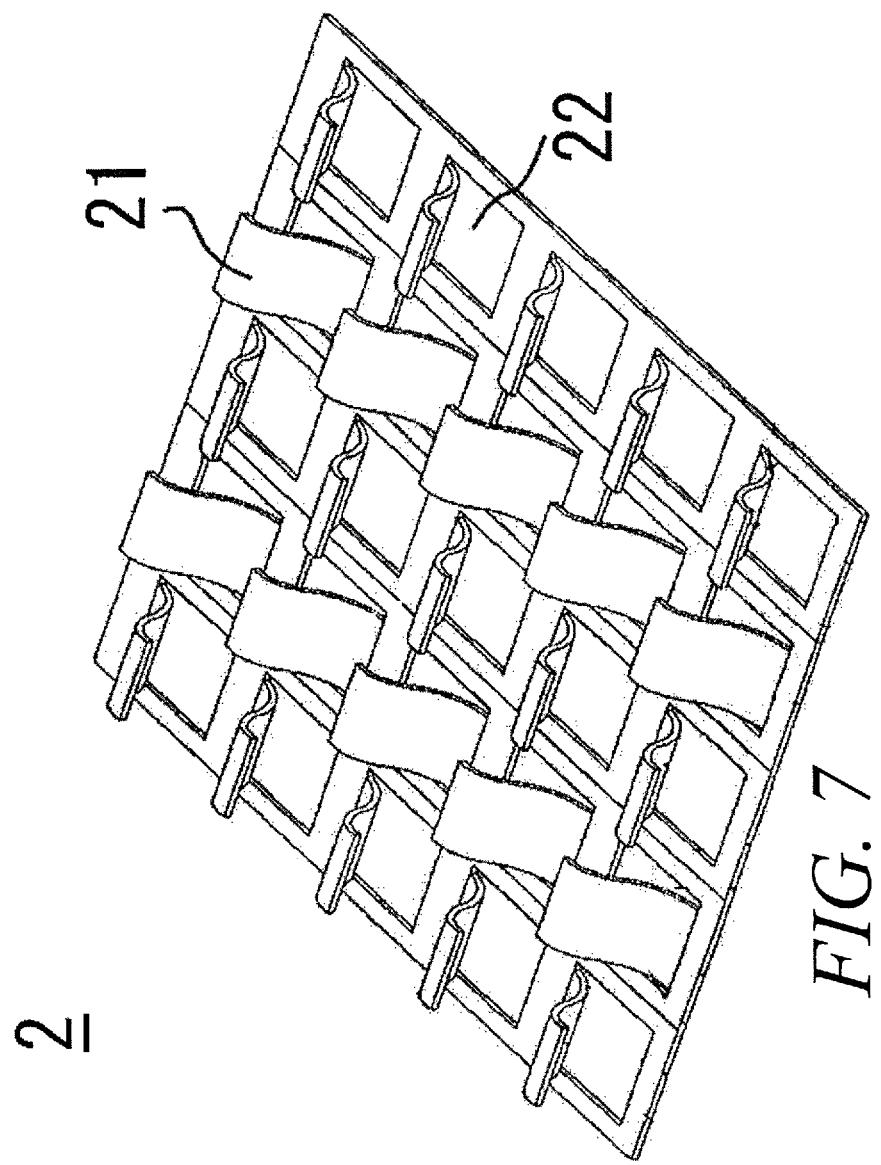
FIG. 7 illustrates an example of a cantilever spring.

Examples of materials that can be used as the current collection assisting layer 2 include expanded metals as illustrated in FIG. 4, perforated metals as illustrated in FIG. 5, metal meshes as illustrated in FIG. 6, cantilever springs formed by cutting a flat plate as illustrated in FIG. 7 and the like, which have many gas flowing holes 22 that penetrate each of them in the laminating direction.

The same metal materials as those of the above-described porous metal support 14 can be used for the current collection assisting layer 2.

The size of the gas flowing holes 22 of the current collection assisting layer 2 is less than the width of the gas channels G formed by the separator 3 (described below), i.e. the intervals of the protruded portions of the corrugation of the separator that are in contact with the current collection assisting layer 2.

Since the cathode electrode 13 and the contacting material layer 4 (described below) are made of a metal oxide that has higher electric resistance than metals, the fuel cell single cell C has decreased power generation efficiency when the travel distance of charges is long in the cathode electrode and the contacting material layer.

Since the current collection assisting layer 2 is provided which has many gas flowing holes 22 that are smaller than the width of the gas channels G, charges in the cathode electrode 13 migrate to the separator 3 through the conductive portion 21 of the current collection assisting layer 2.

This can reduce the travel distance of charges in the cathode electrode and the contacting material layer so as to decrease the electric resistance.

It is preferred that the width of the conductive portion 21 of the current collection assisting layer 2 is within the range of 0.5 mm to 0.15 mm.

Oxide film is readily formed in SOFCs due to its high operating temperature. In particular, oxide film is readily formed to increase the electric resistance in a cathode to which oxygen gas is supplied.

When the width of the conductive portion 21 is less than 0.5 mm, the current collection assisting layer 2 has large surface area. Since this increases the contact area with the oxygen-containing gas, the current collection assisting layer 2 is more likely to be oxidized to increase the electric resistance.

When the width of the conductive portion 21 is greater than 0.15 mm, the oxygen-containing gas travels a long distance to reach the portions where the cathode electrode 13 is in contact with the conductive portion 21. This may make some portions of the cathode electrode 13 less available for power generation and decrease the power generation efficiency.

It is preferred that the porosity of the gas flowing holes 22 of the current collection assisting layer 2 is within the range of 30% to 80%.

When the porosity is less than 30%, it is difficult to supply the oxygen-containing gas to the cathode electrode 13. When the porosity is greater than 80%, charges migrate long distance in the cathode electrode and the contacting material layer.

Separator

The separator 3 comprises continuous protruded portions. The protruded portions are in contact with the current collection assisting layer 2 or an adjacent fuel cell single cell C to electrically join the current collection assisting layer 2 with the adjacent fuel cell single cell C and to form the gas channels G between the current collection assisting layer 2 and the adjacent fuel cell single cell C.

It is preferred that the separator 3 is joined to the current collection assisting layer 2 and to a porous metal support 14 of the adjacent fuel cell single cell C with metal joining portions 31.

The metal joining portions 31 couple and integrate the metal materials of the current collection assisting layer 2, the separator 3 and the porous metal support 14 directly and/or via another metal material. The metal joining portions 31 do not comprise oxide film therein.

By coupling and integrating the metal materials with each other, it is possible to prevent formation of oxide film inside the joining portions 31 since the oxygen-containing gas cannot interpenetrate into the metal joining portions 31.

Therefore, the electric resistance between the current collection assisting layer 2 and the separator 3 and between the separator 3 and the porous metal support 14 of the adjacent fuel cell single cell C can be maintained at a low level, and the power generation efficiency can thus be improved.

The metal joining portion 31 can be formed by welding or brazing.

As used herein, welding refers to melting metal parts themselves to couple and integrate the metal parts with each other. Brazing refers to coupling and integrating metal parts with each other by using other metal material than the metal parts to be coupled.

The separator 3 can be formed by shaping a flat plate of a metal material into a corrugated shape by press working.

The same materials as the above-described metal materials of the porous metal support 14 can be used as the metal material of the separator 3.

Contacting Material Layer

The fuel cell single cell C of the present invention may comprise the contacting material layer 4 between the cathode electrode 13 and the current collection assisting layer 2. The contacting material layer 4 joins the cathode electrode 13 to the current collection assisting layer 2 in the entire surface thereof and serves as a cushion between the current collection assisting layer 2 and the solid electrolyte layer 12.

The current collection assisting layer 2 often has an uneven surface or a warpage, which is likely to cause a winkle or warpage when it is fixed to the separator 3. Therefore, it is difficult to bring the cathode electrode 13 of the fuel cell unit 1 in direct contact with the current collection assisting layer 2 in the entire surface, and this results in the increased contact resistance.

When the current collection assisting layer 2 is strongly pressed against the cathode electrode 13 of the fuel cell unit 1 to bring the current collection assisting layer 2 into contact with the cathode electrode 13 in the entire surface, the fuel cell unit 1 may be damaged by pressing pressure, since the fuel cell unit 1 of the SOFC, which includes the solid electrolyte layer 12, is thin and hard, and the current collection assisting layer 2 is also hard.

When the contacting material layer 4 is provided between the cathode electrode 13 and the current collection assisting layer 2, the contacting material layer 4 can absorb the unevenness or warpage of the current collection assisting layer 2 to form a flat joining surface with the cathode electrode 13. Therefore, the cathode electrode 13 and the current collection assisting layer 2 can be joined to each other well.

The current collection assisting layer 2 can be made of a material that can be sintered along with the cathode electrode 13 to reduce the contact resistance with the cathode electrode 13.

Specifically, besides boron trioxides ($B_2O_3$), zinc oxides (ZnO), vanadium oxides ($V_2O_5$) and molybdenum oxides ($MoO_3$), the metal oxides of the above-described solid oxide layer can be used. They can be used alone or as a combination of two or more.

When the current collection assisting layer 2 contains the same metal oxide as that of the cathode electrode 13, it can be integrated with the cathode electrode 13 to decrease the contact resistance. Furthermore, the current collection assisting layer 2 can maintain the decreased electric resistance for a long time since it is less likely to come apart.

The contacting material layer 4 can be formed by mixing the above-described metal oxide particles with an organic binder, an organic solvent and the like and applying the prepared ink or paste or by forming the material into a flexible sheet or plate and cutting it into a desired shape.

The thickness of the contacting material layer 4 is not particularly limited. It is only necessary that the contacting material layer 4 can absorb the unevenness or warpage of the current collection assisting layer to provide a flat surface on the other side that is to be joined to the cathode electrode.

When the current collection assisting layer 2 has a flat surface that is joined to the cathode electrode 13, the conductive portion 21 of the current collection assisting layer 2 bites into the contacting material layer 4 to a depth less than the thickness of the contacting material layer 4. Accordingly, the cathode electrode is prevented from being damaged by the current collection assisting layer 2 that protrudes on the joining face between the contacting material layer 4 and the cathode electrode 13.

As a result, it is possible to integrate the contacting material layer 4 with the cathode electrode 13 in the entire surface by sintering so as to reduce the contact resistance.

The conductive portion 21 of the current collection assisting layer 2 bites into the contacting material layer 4 when they are joined with each other. The conductive portion 21 that bites into the contacting material layer 4 can reduce the contact resistance between the current collection assisting layer 2 and the contacting material layer 4 and firmly join the current collection assisting layer 2 to the contacting material layer 4.

When the contact resistance of a portion having a small contact area or oxide film causes an increase in resistance, the overall electric resistance of the system remarkably is increased. However, the conductive portion 21 that bites into the contacting material layer 4 and joins to it in the entire surface can prevent such an increase of the electric resistance.

To join the conductive portion 21 to the contacting material layer 4, ink or paste of an application liquid of the contacting material layer can be applied on the current collection assisting layer 2 so that the application liquid of the contacting material layer flows into the gas flowing holes 22. This allows forming a joining portion in which the conductive portion 21 of the current collection assisting layer 2 bites into the contacting material layer 4.

In the embodiment, at least a part of the end of the cathode electrode 13 in the planar direction, the cathode electrode 13 being in the direction perpendicular to the gas channel direction, extends outward beyond the end of the current collection assisting layer 2 in the planar direction of the current collection assisting layer. This can prevent a breakage of the solid electrolyte layer 12 by the current collection assisting layer 2.

Second Embodiment

Figure 8:
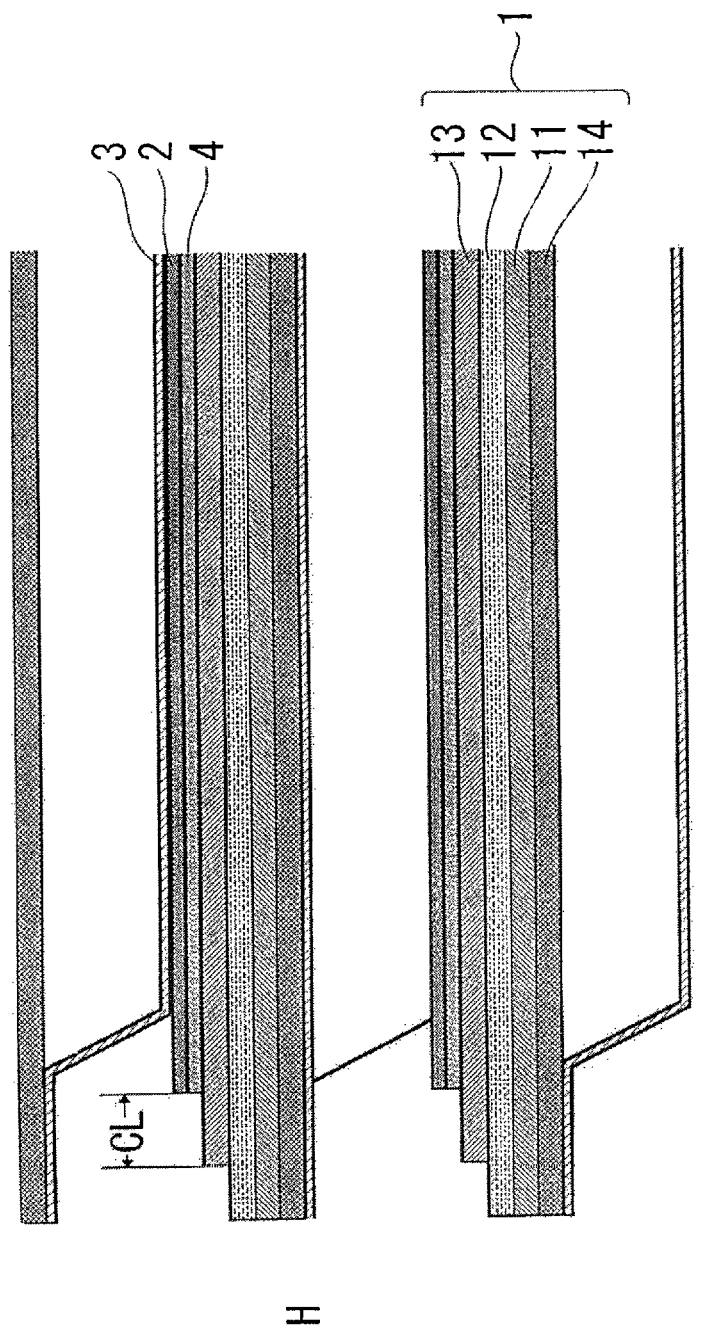
FIG. 8 is a cross-sectional view of a main part of a fuel cell single cell according to a second embodiment.

FIG. 8 is a cross-sectional view of the fuel cell single cell according to the embodiment taken in the gas channel direction, i.e. along the line B-B' in FIG. 1. In the upper fuel cell single cell in FIG. 8, protruded portions of a separator 3 are in contact with a current collection assisting layer. Further, fuel gas channels are formed under the fuel cell unit 1 around the sheet, and oxygen-containing gas channels are formed on the fuel cell unit 1 in front of and behind the sheet.

The same reference signs are denoted to the same components as those in the previous embodiment, and the detailed description thereof is omitted.

In the fuel cell single cell C of the embodiment, the end of the cathode electrode 13 in the upstream of the gas channel direction of the oxygen-containing gas extends outward beyond the end of current collection assisting layer 2 in the upstream of the gas channel direction of the oxygen-containing gas, i.e. is located in the upstream of the gas channel direction of the oxygen-containing gas.

The extended length (CL) of the end of the cathode electrode that extends outward beyond the end of the current collection assisting layer 2 is as long as that in the above-described first embodiment.

The operating temperature of SOFCs is high. When a high-temperature gas is directed into the oxygen-containing gas channels to rapidly increase the temperature for the purpose of reducing the start-up time from a cold state, the temperature is increased from a part proximate to a manifold for supplying the oxygen-containing gas.

When the oxygen-containing gas and a fuel gas flow in the same direction, the temperature is also increased from a part proximate to the manifold for supplying the oxygen-containing gas and a manifold for supplying the fuel gas, i.e. from the upstream of the gas channel direction of the oxygen-containing gas.

Accordingly, the separator 3 most strongly presses the current collection assisting layer 2 in the upstream of the gas channel direction of the oxygen-containing gas.

In the embodiment, the end of the cathode electrode 13 in the upstream of the gas channel direction of the oxygen-containing gas extends outward beyond the end of the current collection assisting layer in the upstream of the gas channel direction. This can prevent the solid electrolyte layer 12 from being damaged in the portion that is most likely to experience thermal expansion.

Third Embodiment

In a fuel cell single cell C of this embodiment, the end of a current collection assisting layer 2 in the direction perpendicular to a gas channel direction extends outward beyond the outermost protruded portion of the separator, which forms gas channels, in the planar direction.

Figure 9:
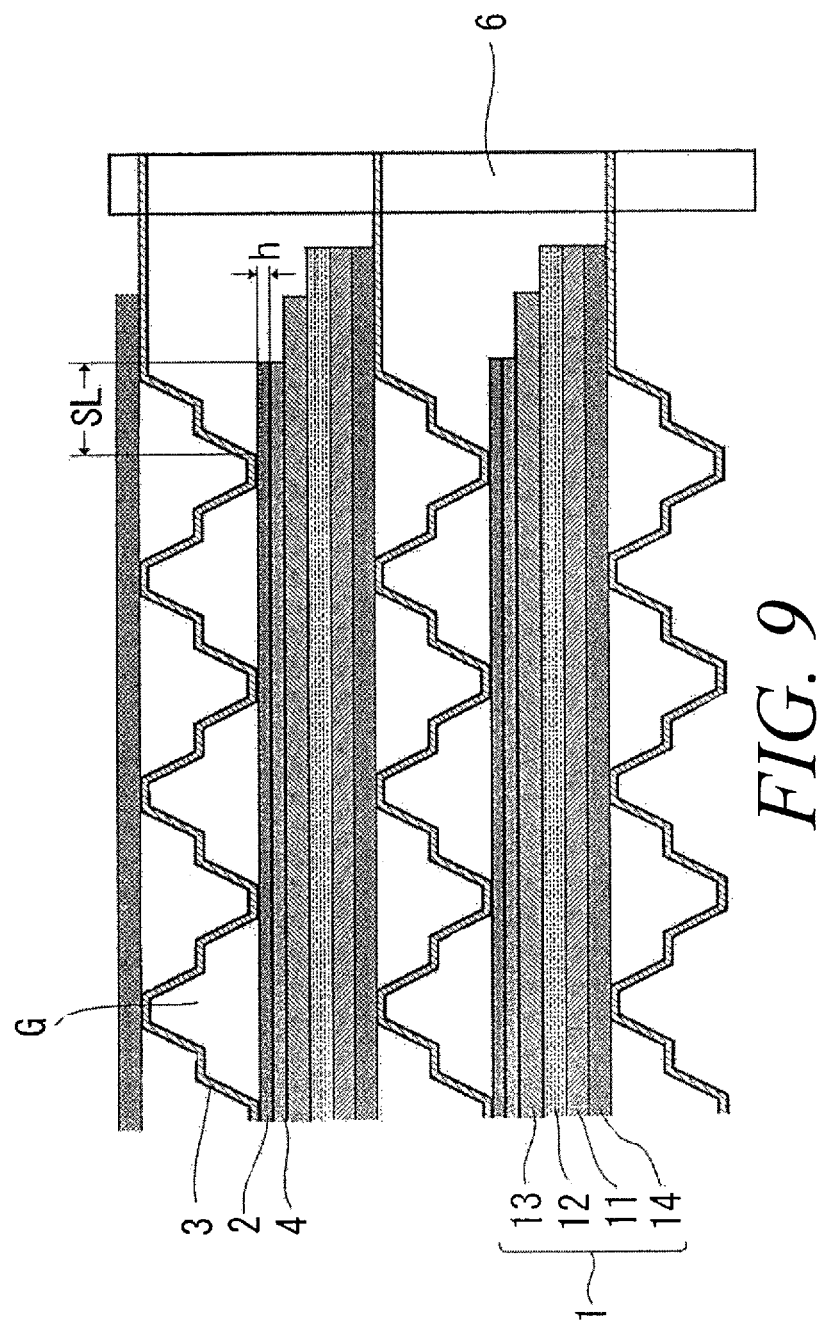
FIG. 9 is a cross-sectional view of a main part of a fuel cell single cell according to a third embodiment.

FIG. 9 is a cross-sectional view taken along A-A' in FIG. 1.

The same reference signs are denoted to the same components as in the previous embodiments, and the detailed description thereof is omitted.

Figure 10:
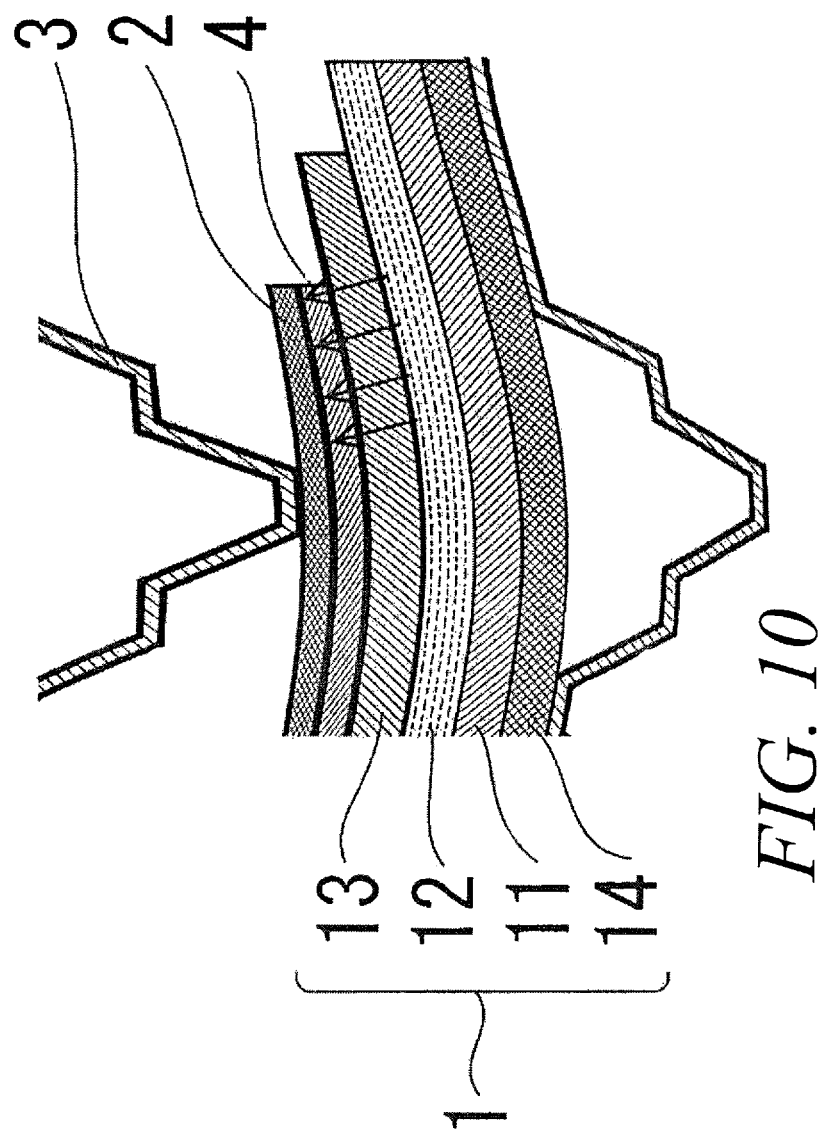
FIG. 10 illustrates a state in which an end of a fuel cell unit presses a current collection assisting layer.

The fuel cell unit 1 bends like a bimetal in a high-temperature condition as illustrated in FIG. 10 since the layers of the fuel cell unit have different coefficients of thermal expansion.

The bending deformation of the current collection assisting layer 2 is less than the bending deformation of the fuel cell unit 1 due to the bending deformation of the separator 3. Accordingly, the end of the fuel cell unit 1 presses the current collection assisting layer 2 as illustrated by the arrows in FIG. 10, and a reaction force of the current collection assisting layer 2 breaks a solid electrolyte layer 12 of the fuel cell unit.

However, since the end of the current collection assisting layer 2 is located at an outside of the outermost protruded portion of the separator 3, the end of the current collection assisting layer 2 does not resist against the bending deformation of the fuel cell unit 1. This can prevent the solid electrolyte layer 12 from being damaged.

The extended length (SL) of the end of the current collection assisting layer 2 that extends outward beyond the protruded portions of the separator 3 is preferably at least 20 times greater than the thickness (h) of the current collection assisting layer 2, although it depends on the fuel cell unit 1 and the current collection assisting layer 2.

Since the extended length (SL) is 20 times greater than the thickness (h) of the current collection assisting layer 2, the load on the fuel cell unit 1 from the distorted current collection assisting layer 2 is equal to or less than one tenth of the bending stress on the fuel cell unit itself due to the thermal expansion of the fuel cell unit 1. This can prevent the solid electrolyte layer 12 from being pressed and broken by the current collection assisting layer 2.

That is, since the current collection assisting layer 2 bends like a beam with fixed ends at the outermost protruded portions of the separator 3, the load on the current collection assisting layer 2 caused by a bending deformation of the fuel cell unit 1 is less than the fracture stress of the fuel cell unit 1. This can prevent a breakage of the fuel cell unit 1.

Fourth Embodiment

In a fuel cell single cell C of this embodiment, an end of a current collection assisting layer 2 in the direction perpendicular to the gas channel direction is fixed outside the outermost protruded portion in the planar direction of a separator.

Figure 11:
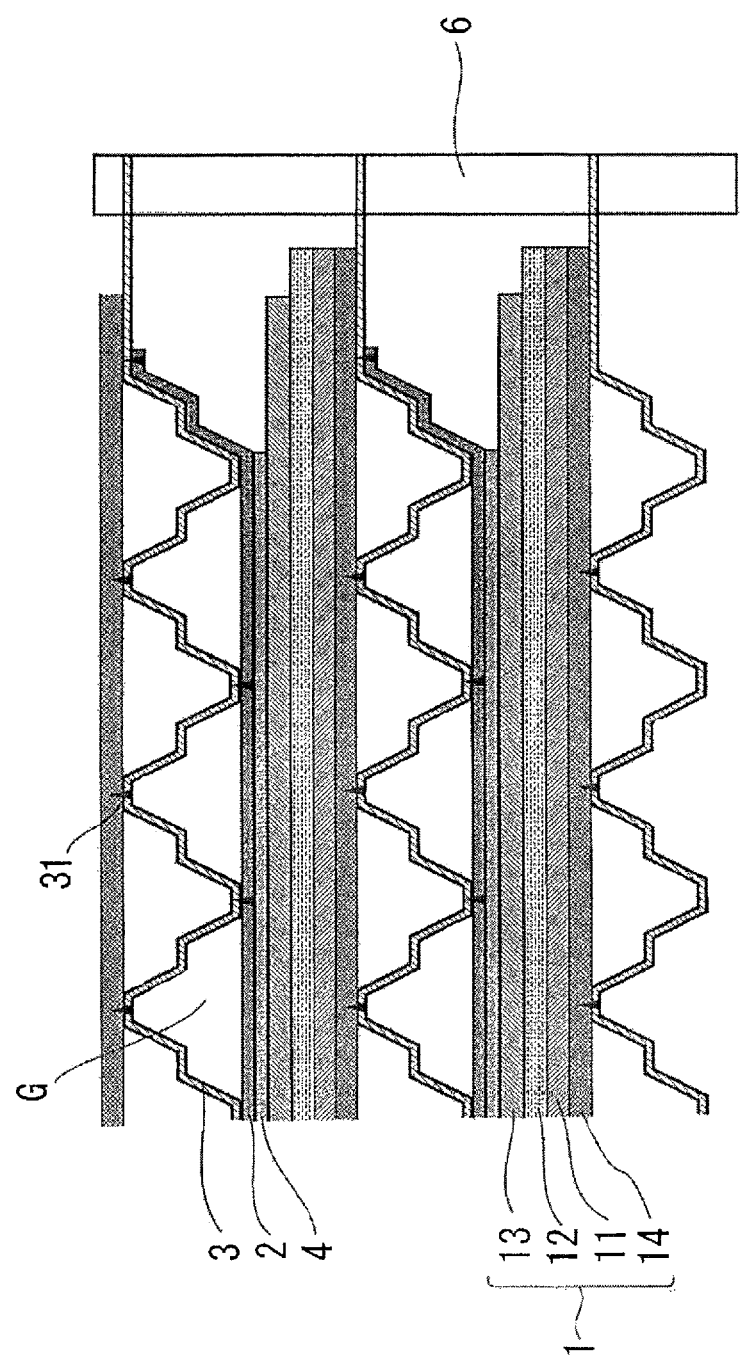
FIG. 11 is a cross-sectional view of a fuel cell single cell according to a fourth embodiment.

FIG. 11 is a cross-sectional view taken along A-A' in FIG. 1.

The same reference signs are denoted to the same components as those in the previous embodiments, and the detailed description thereof is omitted.

Since the end of the current collection assisting layer 2 is fixed outside the outermost protruded portion of the separator in the planar direction, i.e. at a location other than the protruded portions of the separator 3, with a metal joining portion 31. This can prevent the end of the current collection assisting layer 2 from attacking a solid electrolyte layer 12, so as to prevent a breakage of the solid electrolyte layer 12.

Fifth Embodiment

The fuel cell single cell C of this embodiment comprises a contacting material layer 4 between a cathode electrode 13 and a current collection assisting layer 2. Further, an end of the contacting material layer 4 in the direction perpendicular to the gas channel direction, i.e. the part outside an outermost protruded portion of a separator in the planar direction, is thicker than the part inside the outermost protruded portion.

Figure 12:
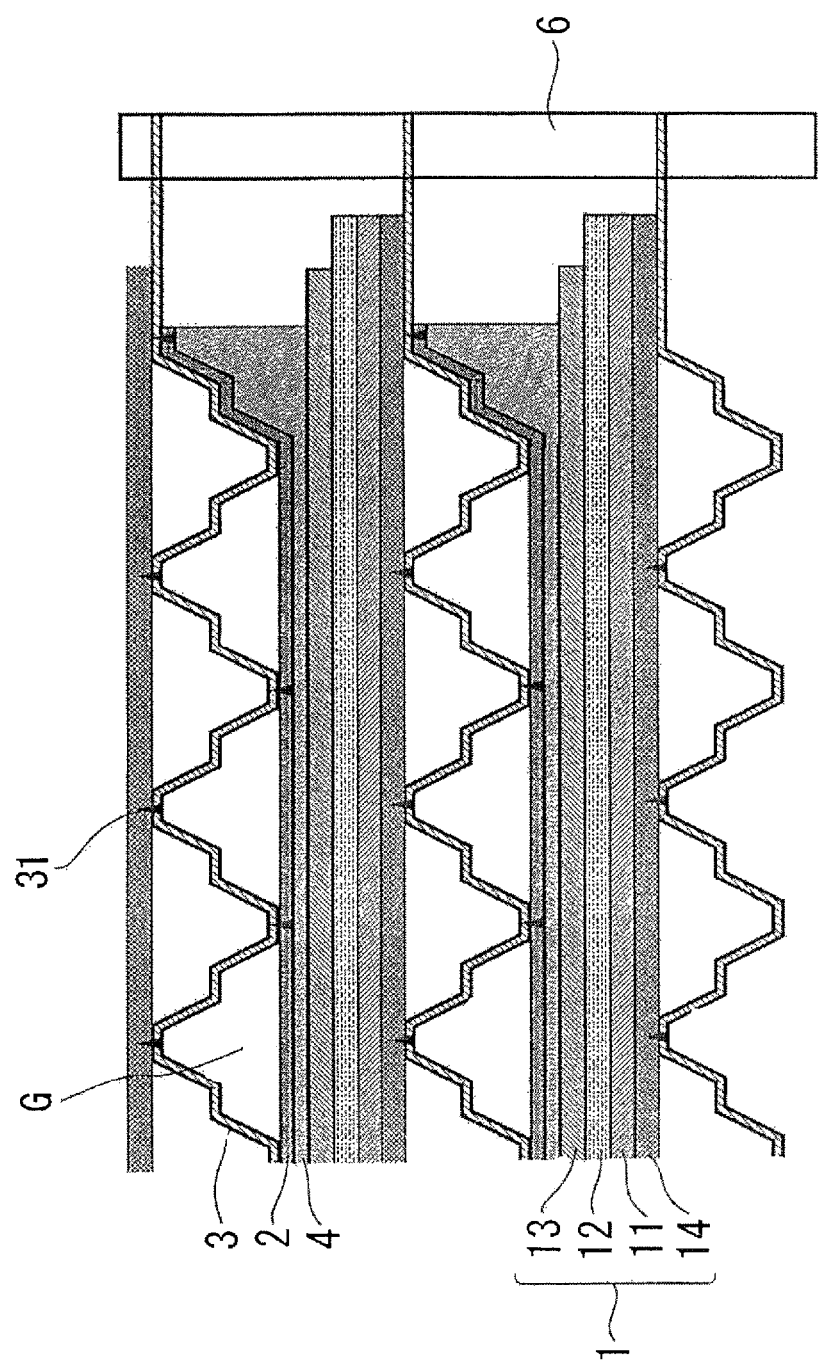
FIG. 12 is a cross-sectional view of a fuel cell single cell according to a fifth embodiment.

FIG. 12 is a cross-sectional view taken along A-A' in FIG. 1.

The same reference signs are denoted to the same components as those in the previous embodiments, and the detailed description thereof is omitted.

In the contacting material layer 4, the part outside the outermost protruded portion of a separator 3 that is in contact with the current collection assisting layer 2 is thicker than the inside. This can extend the distance from the end of the current collection assisting layer 2 to a solid electrolyte layer 12 and allow the contacting material layer 4 to function as a cushion, so as to prevent a breakage of the solid electrolyte layer 12.

REFERENCE SIGNS LIST

1 Fuel cell unit
11 Anode electrode
12 Solid electrolyte layer
13 Cathode electrode
14 Porous metal support
2 Current collection assisting layer
3 Separator
4 Contacting material layer
5 Frame
6 Sealing member
G Gas channel
H1 to H4 Manifold
C Fuel cell single cell

The invention claimed is:
1. A fuel cell single cell, comprising:
a fuel cell unit in which an anode electrode, an electrolyte layer and a cathode electrode are sequentially laminated;
a separator;
a current collection assisting layer disposed between the cathode electrode of the fuel cell unit and the separator; and
a contacting material layer disposed between the cathode electrode of the fuel cell unit and the current collection assisting layer to absorb unevenness or warpage, wherein a conductive portion of the current collection assisting layer bites into and is joined with the contacting material layer,
wherein the separator has a corrugated transverse cross section and comprises a plurality of corrugations, at least one corrugation having a protruded portion that is in contact with the current collection assisting layer to form gas channels between the separator and the current collection assisting layer, at least a part of an end of the cathode electrode in an upstream gas channel direction of oxygen containing gas extends outward beyond an end of the current collection assisting layer in the upstream gas channel direction, and at least a part of an end of the cathode electrode in a planar direction of the cathode electrode extends outward beyond an end of the current collection assisting layer in a planar direction of the current collection assisting layer.

2. The fuel cell single cell according to claim 1, wherein the current collection assisting layer comprises a conductive portion and gas flowing holes that penetrate the current collection assisting layer in a laminating direction of the fuel cell unit.

3. The fuel cell single cell according to claim 1, wherein the current collection assisting layer comprises an expanded metal.

4. The fuel cell single cell according to claim 1, wherein an extend length of the end of the cathode electrode that extends outward beyond the end of the current collection assisting layer is greater than $1/1000$ of a length of the cathode electrode.

5. The fuel cell single cell according to claim 1, wherein the end of the cathode electrode in a planar direction perpendicular to a gas channel direction extends beyond the end of the current collection assisting layer in the planar direction perpendicular to the gas channel direction to be located outside the end of the current collection assisting layer in the planar direction perpendicular to the gas channel direction.

6. The fuel cell single cell according to claim 1, wherein each corrugation of the plurality of corrugations has a protruded portion, and wherein the end of the current collection assisting layer in a gas channel direction and/or the end of the current collection assisting layer in a direction perpendicular to the gas channel direction is located outside an outermost protruded portion of the separator in a planar direction of the protruded portions of the separator.

7. The fuel cell single cell according to claim 6, wherein an extended length of the end of the current collection assisting layer, the end being located outside the outermost protruded portion of the separator forming the gas channels in the planar direction of the protruded portions of the separator, is at least 20 times greater than a thickness of the current collection assisting layer.

8. The fuel cell single cell according to claim 1,
wherein the current collection assisting layer includes a fixed point at which the end of the current collection assisting layer in the direction perpendicular to a gas channel direction is fixed to the separator, and the fixed point of the current collection assisting layer is outside an outermost protruded portion of the separator forming the gas channels in a planar direction of the separator.

9. The fuel cell single cell according to claim 1,
wherein the contacting material layer comprises particles of a metal oxide.

10. The fuel cell single cell according to claim 9, wherein within range that the current collection assisting layer is in contact with the separator, a part of the contacting material layer that is outside an outermost protruded portion of the separator in the direction perpendicular to a gas channel direction is thicker than a part of the contacting material layer that is inside the outermost protruded portion.

11. The fuel cell single cell according to claim 9, wherein the conductive portion of the current collection assisting layer bites into the contacting material layer to a depth that is less than a thickness of the contacting material layer.

12. The fuel cell single cell according to claim 1, wherein the fuel cell unit comprises a frame around a periphery of a porous metal support.

13. The fuel cell single cell according to claim 12, wherein the anode electrode, electrolyte layer and the cathode electrode are supported by the porous metal support.

* * * * *